United States Patent [19]

Smith

[11] Patent Number: 5,906,140

[45] Date of Patent: May 25, 1999

[54] SLOTTED BRAKE HOUSING

[75] Inventor: Timothy J. Smith, Barrington, Ill.

[73] Assignee: SRAM Corporation, Chicago, Ill.

[21] Appl. No.: 08/929,572

[22] Filed: Sep. 15, 1997

[51] Int. Cl.$^6$ .................................. F16C 1/10; F16C 1/22
[52] U.S. Cl. .......................... 74/502.2; 74/502.6
[58] Field of Search .................. 74/489, 502.2, 74/502.6

[56] References Cited

U.S. PATENT DOCUMENTS

| | | | |
|---|---|---|---|
| 4,319,673 | 3/1982 | Kojima | 74/489 X |
| 5,564,311 | 10/1996 | Chen | 74/502.2 X |

Primary Examiner—John A. Jeffery
Assistant Examiner—Brandon C. Stallman
Attorney, Agent, or Firm—Milan Milosevic; Foley & Lardner; Jefferson Perkins

[57] ABSTRACT

A bicycle brake lever assembly attachable to a handlebar, comprising a lever pivotally attached to a brake housing, the housing having a substantially continuous hoop of material across the top and sides of the housing maximizing the flexural and torsional stiffness of the braking lever assembly. Impact loads from collisions With natural objects are transmitted from the brake lever through the housing to the handlebar, the housing being significantly more rigid to sustain transverse loading delivered by the lever. The housing providing a cable insertion slot on a shielded surface projecting substantially onto a plane substantially orthogonal to the bicycle handlebar.

14 Claims, 2 Drawing Sheets

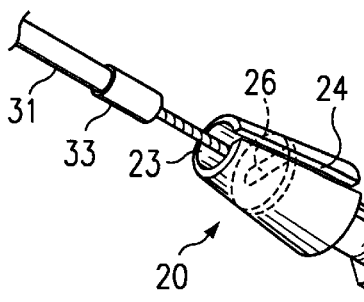
FIG. 4
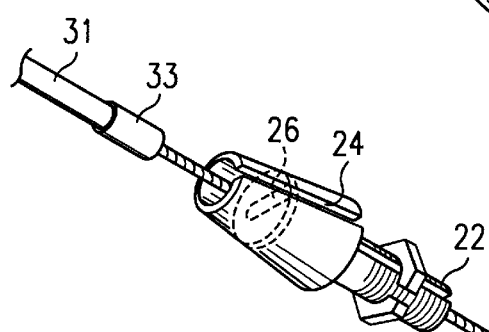
FIG. 4a
FIG. 4b

SLOTTED BRAKE HOUSING

BACKGROUND OF THE INVENTION

1. Field of the Invention

This invention relates generally to bicycle brake lever assemblies and more particularly to a brake assembly having a partially slotted brake lever housing.

2. Related Art

Bicycle brake systems comprise an actuating assembly or brake lever, operatively connected by a control cable within a housing (i.e. Bowden cable) to a responding assembly such as brake calipers. Actuation of the brake lever by a rider's hand causes an axial displacement of a linking cable, in turn causing brake shoes attached to the brake calipers to clamp down on the rim of a bicycle wheel, thereby slowing the bicycle. Likewise, bicycle gear shifting systems comprise an actuating assembly or shifter, operatively connected by a Bowden cable to a responding assembly, typically a derailleur. Actuation of the shifter by a rider's hand causes an axial displacement of a linking cable, which in turn causes the derailleur to urge a drive chain between various sprockets of a freewheel at the real derailleur or chainrings at the front derailleur, thereby effecting a gear shift. Although herein described with respect to brake lever assemblies, the present invention is an improvement to all cable actuating assemblies.

Typically, in brake lever assemblies, the brake lever is pivotally attached to a brake housing which is in turn clamped to the handlebar near a rider's handgrip. The control cable is routed through the brake housing, with a cable end removably attached to the brake lever. Likewise, in shifter actuating assemblies, the cable is routed through the actuator housing, with a cable end removably attached to the shift actuating member, be it a rotatable or lever-type actuating, device. Removably attaching the cable end to the brake lever permits a rider to replace a broken cable quickly without having to disassemble the brake lever or feed the entire length of cable through the housing. This is especially critical when replacing cables under field conditions. In order to accommodate cable replacement, existing brake lever assemblies typically have a slot cut along the length of the front of the brake housing, through which the cable is inserted into the housing FIG. 1 is an isometric vies of the components comprising a conventional brake lever assembled including a full length slot 19 cut along the length of the top of brake housing 11. Such a slot significantly reduces the flexural and torsional stiffness of the brake housing, allowing the brake housing to be spread open during frontal impact loading of the housing itself or due to transverse loading on the brake lever. Because the brake lever assembly is positioned ahead of the handlebar, it is particularly susceptible to such impact loading. This is especially true in off-road mountain biking, where there is a greater threat of collision with natural obstacles. Because the brake housing functions as the pivot anchor for the brake lever, it is essential that it resist deformation and retain its shape, thereby preventing brake lever rotation around an axis other than that of the pivot pin and ensuring smooth lever operation Other existing brake lever assemblies have a partial slot and adjoining insertion hole cut across the top or sides of the brake housing, the insertion hole sufficiently sized to receive a cable end. FIGS. 2 and 3 are perspective and side views of conventional brake lever assemblies showing partial slots 62, 63 and insertion holes 64, 65 along the top and sides of brake housing 11 respectively. Although stiffer than fully-slotted brake housings, these brake housings, nevertheless, are weakened by a relatively thin strip of material b, located between the end of the insertion hole and the housing edge, that likewise produces a relatively flexible brake housing. With the increased reliance on lighter weight plastic versus metallic bicycle components, it becomes increasingly important to design more rigid and structurally efficient brake lever components.

SUMMARY OF THE INVENTION

It is an object of this invention to provide a brake lever assembly having a brake housing with a continuous hoop of material across the top and sides of the brake housing, maximizing the flexural and torsional stiffness of the brake housing, while still providing an insertion slot and bore for receiving the cable and cable end.

It is another object of this invention to provide a brake housing having a cable insertion slot and bore that are substantially orthogonal to the torsional and flexural or prying loads sustained by the housing during impact loading.

It is a further object of this invention to provide a brake housing having top and side portions that are substantially smooth, featureless, and more aerodynamic, thereby reducing the likelihood of trapping branches or brush in the brake housing when riding in off-road environments.

In accordance with the objects and advantages of the present invention, a cable actuator housing such as a bicycle brake lever housing, includes a barrel adaptable to circumscribe a control cable, an anchor, such as a clamp, which is attachable to a physical reference such as a to a handlebar, and a linking member connecting the barrel to the anchor and having a shielded surface extending outwardly from the handlebar, the surface of the linking member including an insertion slot for receiving the control cable, the slot extending from the bore defined by the barrel into the linking member along the shielded surface.

In a preferred embodiment, the barrel, linking member, and anchor, or portions thereof, are integrally formed.

BRIEF DESCRIPTION OF THE DRAWINGS

Further aspects and advantages of the invention will be discerned from the following detailed description when viewed with the drawings in which like parts are represented by like characters and in which.

Figure 1:
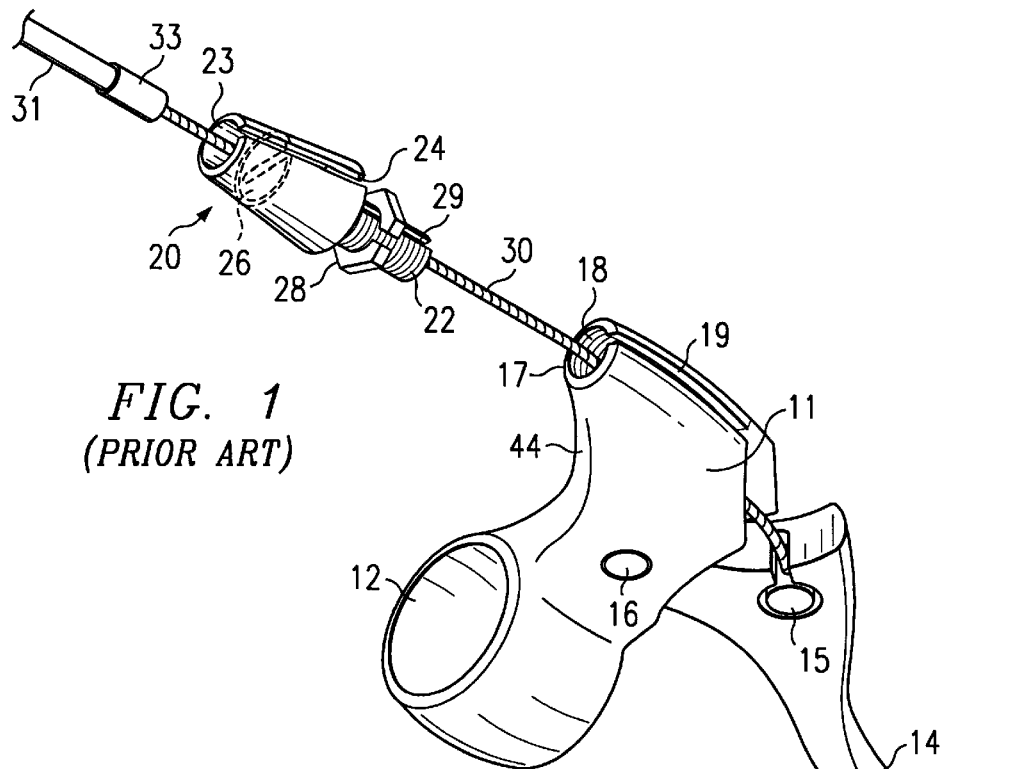
FIG. 1 is an exploded isometric view of the components comprising a conventional brake lever assembly.
Figure 2:
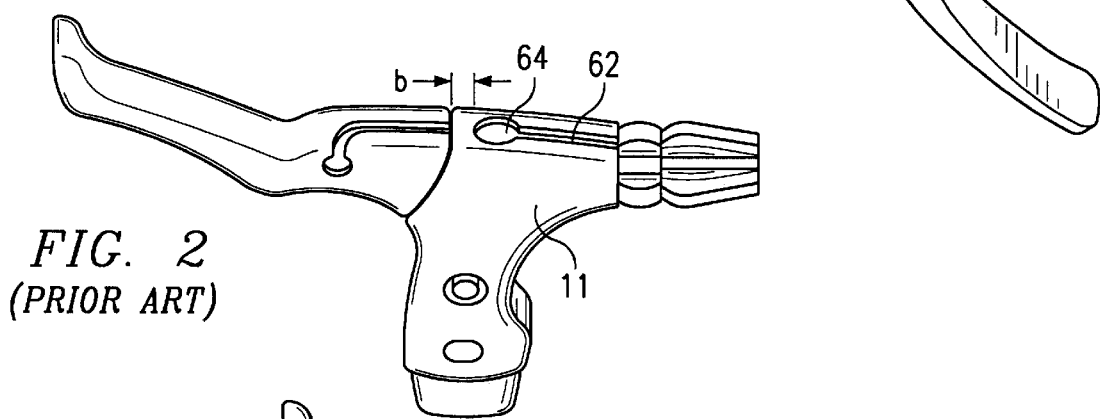
FIG. 2 is a perspective views of another conventional brake lever assembly.
Figure 3:
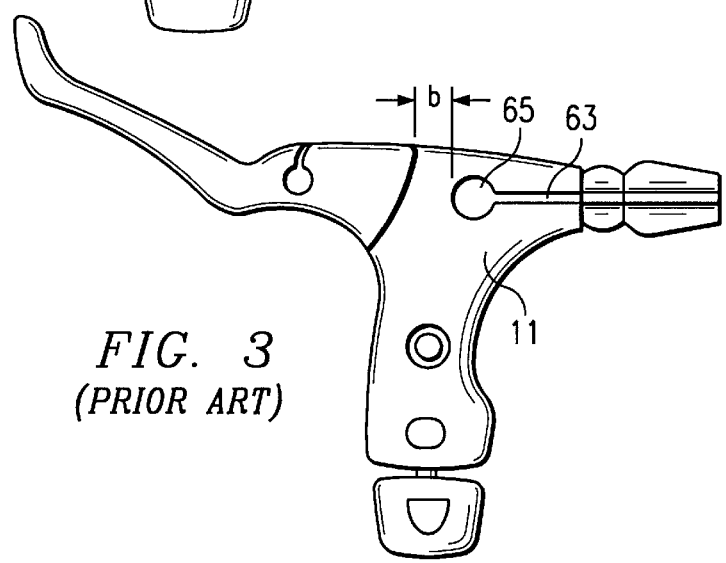

FIG, 3 is a side view of yet another conventional brake lever assemble, and

FIGS. 4 and 4a and 4b are exploded isometric views of the components comprising a brake lever assembly of this invention.

DETAILED DESCRIPTION OF THE INVENTION

As shown in FIG. 4, a preferred embodiment of a slotted brake lever assembly in accordance with this invention is designated generally by reference number 10. As shown, slotted brake lever assembly 10 includes a brake housing 11 that receives a bicycle handlebar 60 (drawn in phantom) through bore 12 and is attached thereto with clamp 13. A brake lever 14 is pivotally connected to brake housing 11 at pivot 16, pivot 16 spanning and supported by side members 43 45 (opposite) of brake housing 11. A barrel adjuster 20, operatively connected to the brake housing 11 at one end and abutting cable housing end 33 at the other end, permits adjustment of the length of cable travel by effectively lengthening or shortening the length of cable housing 31.

As installed, a brake cable 30 slides reciprocally through a barrel adjuster 20 and a bore 18 defined by a barrel 17 of brake housing 11, and is removably connected to brake lever 14 at a seat 15 which receives a cable end 32 (FIG. 4a) Cable end 32 has an enlarged diameter in comparison with the diameter of cable 30 and typically consists of a cylindrical or disk-shaped metal casting (a disk-shaped end 32 is shown) Seat 15 is a receptacle, sized and shaped to receive cable end 32

Barrel adjuster slots 24, 29, slightly wider than the diameter of brake cable 30, necessarily run the entire length of the barrel adjuster 20 and lock nut 28 because the enlarged cable end 32 cannot be fed through the barrel adjuster 20 itself. A bearing surface 26, shown in hidden line, is formed as a transition between a bore 23 which receives a housing end 33 of cable housing 31, and a deeply channeled portion of slot 24, which forms the remainder of the path for cable 30 through adjuster 20. Bearing surface 26 of the barrel adjuster 20 blocks the entry of cable end 32 at one end of the barrel adjuster 20. Therefore, cable 30 must be "lowered" into the barrel adjuster 20 through slots 24 and 29, first ensuring that slot 29 of the lock nut 28 is aligned with slot 24 of the barrel adjuster 20. Cable end 32 is then fed through brake housing 11, entering through an insertion hole 41 with a slot 42 receiving cable 30, with cable end 32 removably attached to lever 14 at seat 15.

Insertion hole 41 and slot 42 are located on a surface 44 of the brake housing, which is substantially orthogonal to side members 43, 45, surface 44 disposed substantially in a plane orthogonal to the bicycle handlebar and parallel to the axis of pivot 16. Surface 44 may face substantially inboard on the bicycle or with an elongated barrel 17, as shown in FIG. 4b, may face substantially toward the handlebar 60. Insertion hole 41 and slot 42 can be located on any portion of surface 44 with slot 42 beginning, at bore 18 of barrel 17. Because surface 44 is on the protected underside or "belly" of the brake housing 11, it is shielded from impact with foreign objects thereby preventing insertion hole 41 and slot 42 from trapping branches and brush when riding off-road. For this reason, it is preferred that surface 44 be concave as shown, additional protection to slots 41, 42 then being afforded by an inboard extension of barrel 17.

During actuation of the brake lever, lever 14 pivots about pivot 16 in a plane substantially parallel to side members 43,45 of the brake housing 11. During impact with foreign objects, lever 14 sustains damaging loads orthogonal to the planes defined by side member 43, 45, thereby prying members 43, 45 apart. Locating insertion hole 41 and slot 42 along the length of surface 44 maximizes the flexural and torsional rigidity of the housing 111 by providing a continuous hoop of material along the top 45 and side members 43, 45 of the brake housing 11.

The present invention permits a brake housing to be manufactured of materials exhibiting a torsional or flexural strength lower than steel or aluminum alloys. One such material is Grilon®, a tough composite plastic. Further, because the barrel adjuster of the invention is preferably made of plastic, it still be lighter per unit volume. Thus, the present invention enables the manufacture of brake lever components that are considerably lighter and stiffer than those of conventional brake lever assemblies.

Although the invention has been described with reference to various embodiments, these embodiments are merely illustrative, For instance, the strategic placement of the cable insertion slot as herein described, may be used in other control cable actuation systems with lever or non-lever applications. The present invention may be used in an) application, vehicular or non-vehicular, in which an axially displaceable control cable needs to be attached to a movable actuator and threaded through an actuator housing, the housing attachable by an anchor to a physical reference and the actuator moves with respect to the physical reference. Such applications include bicycle derailleur shift actuators. Accordingly, this invention is to be limited solely by the appended claims.

I claim:

1. A control cable actuator housing comprising:
    a barrel defining a bore adaptable to circumscribe a control cable, the barrel having an inlet and an outlet;
    an anchor for fixing the actuator housing to a physical reference;
    an actuator moving with respect to said reference and adapted to be coupled to a control cable to axially displace a control cable, wherein the actuator is proximate the outlet of the barrel and remote from the inlet of the barrel; and
    a linking member connecting said barrel to said anchor and having a surface proximate to the inlet and remote from the outlet, the surface projecting outwardly from the physical reference to the barrel and disposed substantially in a plane which intersects an axis of the barrel, said surface including an insertion slot for receiving a control cable, the slot having a closed end and an open end which opens onto the inlet, the slot extending from the inlet of the barrel into said linking member along the surface.

2. An actuator housing according to claim 1, wherein said surface of the linking member is substantially orthogonal to an axis of the physical reference.

3. An actuator housing according to claim 1, wherein said barrel and linking member are formed integrally.

4. An actuator housing according to claim 3, wherein said barrel, said linking member, and a clamp adaptable to clamp the linking member to the reference are formed integrally.

5. A bicycle actuator assembly comprising:
    a control cable
    an actuator housing, including:
        a barrel defining a bore adaptable to circumscribe the control cable, the barrel having an inlet and an outlet;
        a clamp attachable to a handlebar;
        a linking member projecting outwardly from said clamp to said barrel and having a surface proximate the inlet and remote from the outlet, the surface disposed substantially in a plane which intersects an axis of the barrel and including an insertion slot for receiving the control cable, the slot having a closed end and an open end which opens onto the inlet, the slot extending from the inlet of the barrel into said linking member along the surface; and
        an actuating member proximate the outlet of the barrel and remote from the inlet of the barrel and operatively connected to said actuator housing at a connection point, said actuating member having one end of the control cable removably attached thereto at a location remote from the connection point.

6. A bicycle actuator assembly according to claim 5, wherein said actuating member includes a brake lever pivotally attached to said actuator housing.

7. A bicycle actuator housing according to claim 5, wherein the plane projecting outwardly from the handlebar is substantially orthogonal to the handlebar.

8. A bicycle actuator housing according to claim 5, wherein said barrel and linking member are formed integrally.

9. A bicycle actuator housing according to claim 8, wherein said barrel, linking member, and clamp are formed integrally.

10. A bicycle actuator housing comprising:

an elongated barrel defining a bore adaptable to circumscribe a control cable, the barrel having an inlet, an outlet and a top and opposed sides joined by the top, the barrel including a continuous hoop of material across said top and sides extending from the inlet to the outlet;

a clamp attachable to a handlebar; and a linking member projecting outwardly from said clamp to said barrel and connecting said barrel to said clamp, an insertion slot for receiving a control cable, the slot having a closed end and an open end opening onto the inlet of the barrel, the slot extending from the inlet into said linking member, the insertion slot disposed between the top and sides of the barrel and the clamp so as to be shielded by the top and sides of the barrel.

11. A bicycle actuator housing according to claim 10, wherein the shielded surface describes a concave profile.

12. A bicycle actuator assembly comprising:

a control cable an actuator housing, including:
 a barrel defining a bore adaptable to circumscribe the control cable, the barrel having an inlet, an outlet, a top, and opposed sides joined by the top, a bottom of the barrel extending between the sides and disposed proximate the inlet;
 a clamp attachable to a handlebar; and
 a linking member connecting said barrel to said clamp and having a surface extending outwardly from the clamp to the bottom of the barrel;
 an insertion slot formed in the bottom of the barrel for receiving the control cable, the slot having a closed end and an open end opening onto the inlet into linking member along the surface; and
 an actuating member operatively connected to said actuator housing at a connection point, said actuating member having one end of the control cable removable attached thereto at a location remote from the operative connection point.

13. A bicycle actuator housing, comprising:

an elongated barrel defining a bore adaptable to circumscribe a control cable, the barrel having an inlet, and outlet, a top, and opposed sides joined by the top, a bottom of the barrel extending between the sides and disposed proximate the inlet;

a clamp attachable to a handlebar; and a linking member connecting the barrel to the clamp and having a surface extending outwardly from the clamp to the bottom of the barrel, an insertion slot formed in the bottom of the barrel for receiving a control cable, the slot having a closed end and an open end opening onto the inlet.

14. A bicycle actuator assembly, comprising:

a control cable an actuator housing, including:
 a barrel defining a bore adaptable to circumscribe the control cable, the barrel having an inlet, an outlet and a top and opposed sides joined by the top, the barrel including a continuous hoop of material across said top and sides extending from the inlet to the outlet;
 a clamp attachable to a handlebar;
 a linking member projecting outwardly from the clamp to the barrel and connecting the barrel to the clamp, an insertion slot for receiving the control cable, the slot having a closed end and an open end opening onto the inlet of the barrel, the slot extending from the inlet into the linking member, the insertion slot disposed between the top and sides of the barrel and the clamp so as to be shielded by the top and sides of the barrel; and
 an actuating member operatively connected to the actuator housing at a connection point, the actuating member having one end of the control cable removably attached thereto at a location remote from the connection point.

* * * * *

UNITED STATES PATENT AND TRADEMARK OFFICE
CERTIFICATE OF CORRECTION

PATENT NO. : 5,906,140

DATED : May 25, 1999

INVENTOR(S) : Timothy J. Smith

It is certified that error appears in the above-identified patent and that said Letters Patent is hereby corrected as shown below:

In the Abstract, line 6, delete "With" and insert --with--.
In Column 1, line 44, insert a period after "housing".
In Column 1, line 44, delete "vies" and insert --view--.
In Column 1, line 46, delete "assembled" and insert --assembly,--.
In Column 1, line 67, insert a comma after "11".
In Column 2, line 29, insert a comma after "housing".
In Column 3, line 2, insert a comma after "43".
In Column 3, line 14, insert a period after "shown)".
In Column 3, line 21, insert a comma after "23".
In Column 3, line 41, delete the comma after "beginning".
In Column 3, line 56, delete "111" and insert --11--.
In Column 4, line 6, delete "an)" and insert --any--.
In Column 6, lines 3-4, delete "removable" and insert --removably--.

Signed and Sealed this

Second Day of November, 1999

Attest:

Q. TODD DICKINSON

Attesting Officer

Acting Commissioner of Patents and Trademarks